United States Patent [19]

Cheng et al.

[11] Patent Number: 6,104,413

[45] Date of Patent: Aug. 15, 2000

[54] METHODS AND SYSTEMS FOR STORING TEXELS RETRIEVABLE IN A SINGLE CYCLE

[75] Inventors: Chun-Yang Cheng, Hsin Chu; Sy-Shann Luo, Tou-Yun; Chun-Kai Huang, Tai-chung; Yu-Ming Lin, Hsin Chu, all of Taiwan

[73] Assignee: Industrial Technology Research Institute, Taiwan

[21] Appl. No.: 09/038,760

[22] Filed: Mar. 11, 1998

[51] Int. Cl.⁷ ....................................................... G06F 13/00
[52] U.S. Cl. ........................... 345/508; 345/430; 345/516
[58] Field of Search ..................................... 345/430, 515, 345/516, 507–510

[56] References Cited

U.S. PATENT DOCUMENTS 5,544,292  8/1996  Winser ..................................... 395/130
5,751,292  5/1998  Emmot ..................................... 345/430

Primary Examiner—Kee M. Tung
Attorney, Agent, or Firm—Christensen O'Connor Johnson & Kindness PLLC

[57] ABSTRACT

Methods and systems for storing texels in memory banks in a manner that allows the retrieval of four neighboring texels within a single cycle are disclosed. The four neighboring texels are stored in separate memory banks according to a predetermined set of combinations of 2-D (u, v) coordinate pairs. In interpolating the color value of a color texel C(u, v), a texel buffer retrieves the four neighboring texels in a single cycle to reduce the memory access time. In one embodiment, a plurality of memory banks in the texel buffer are designed in an interleave mode. In an alternative embodiment, a plurality of memory banks in the texel buffer are implemented in a noninterleave mode. In both embodiments, a texel buffer retrieves the four neighboring texels of a color texel C(u, v) within a single cycle according to a predetermined set of criteria.

22 Claims, 12 Drawing Sheets

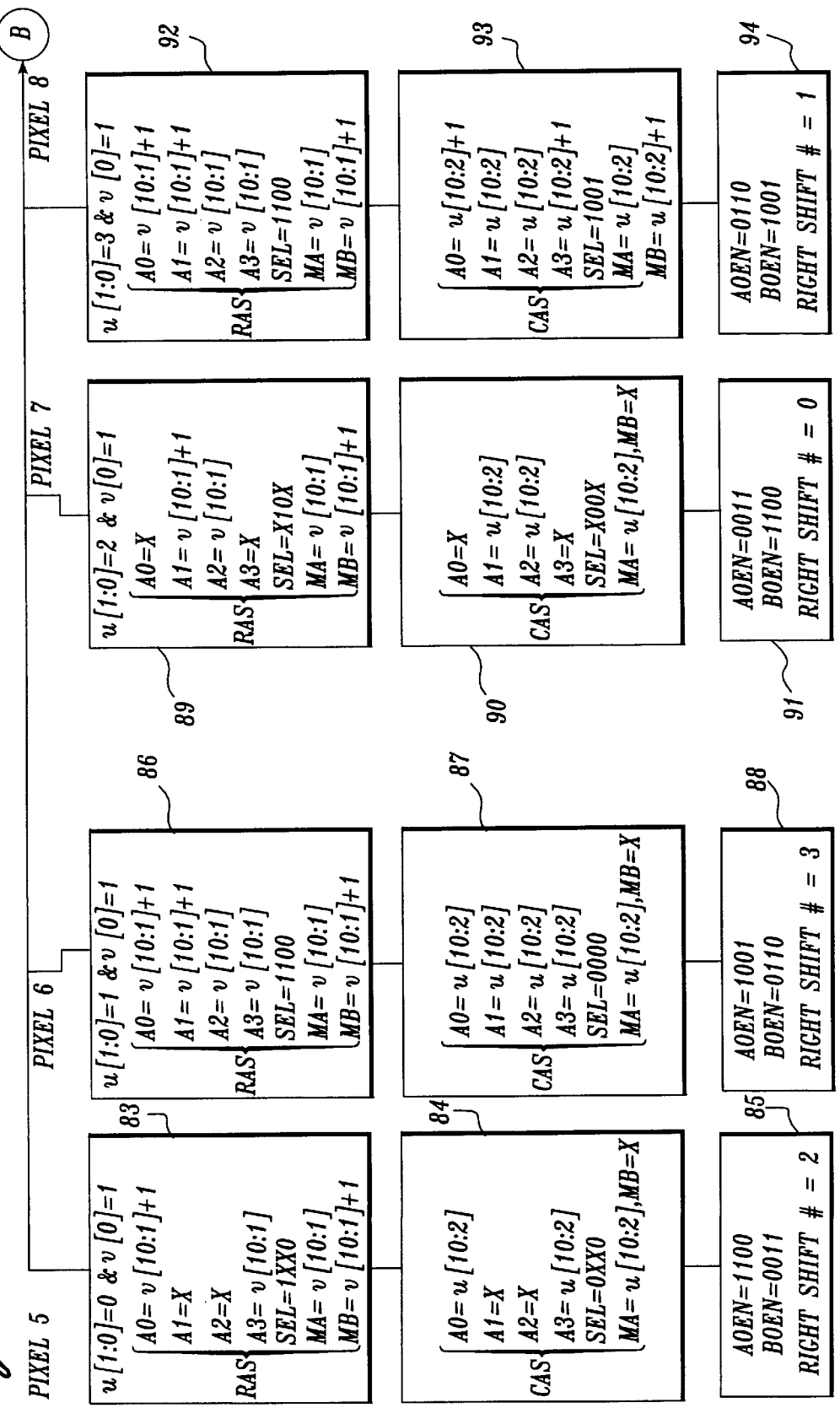

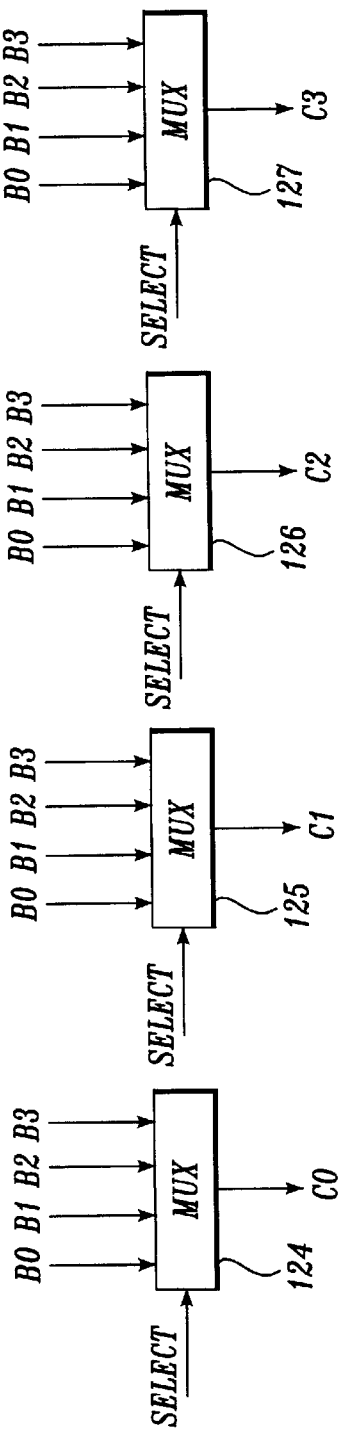

METHODS AND SYSTEMS FOR STORING TEXELS RETRIEVABLE IN A SINGLE CYCLE

FIELD OF THE INVENTION

The present invention relates generally to computer graphics, and more particularly, to storing texels in texture mapping.

BACKGROUND OF THE INVENTION

Texture mapping has been used to add realism to three-dimensional images in computer graphics. Texture mapping maps an image, either digitized or synthesized, onto a surface. The image is called a texture map, and its individual elements are referred to as texels. A three-dimensional image in texture mapping is mapped to a plurality of two-dimensional (2-D) coordinate pairs. The plurality of 2-D coordinate pairs are generated on a (u, v) texture coordinate (TC) space. At each pixel, selected texels are used to substitute for or to scale one or more of the image's surface. One pixel is generally covered by a number of texels. The texels are often used to interpolate the pixel when the pixel does not match one of the integer texels.

FIG. 1 is a spatial diagram of interpolating four neighboring integer texels to obtain the value of a color texel in a (u, v) texture coordinate space. The four neighboring integer coordinate texels in the texture map form a quadrilateral to approximate the actual location of the value of color due to the surface curvature. The value of color at coordinate (u, v), denoted by the symbol C(u, v), is surrounded by four neighboring coordinate texels which are integer numbers. The symbol C0(ui, vi) denotes a first texel located in the nearest upper-left corner relative to the C(u, v) color texel. The symbol C1(ui+1, vi) denotes a second texel located in the nearest upper-right corner relative to the C(u, v) color texel. The symbol C2(ui, vi+1) denotes a third texel located in the nearest lower-left corner relative to the C(u, v) color texel. The symbol C3(ui+1, vi+1) denotes a fourth texel located in the nearest lower-right corner relative to the C(u, v) color texel. Bi-linear filtering or interpolation techniques are used to compute the C(u, v) color texel if the C(u, v) color texel does not match one of the integer texels stored in a texel buffer. The bi-linear interpolation for the four neighboring texels is calculated using the following equations:

$$Ci = C0(1 - Wu) + C1 * Wu$$
$$Cj = C2(1 - Wu) + C3 * Wu$$
$$C = Ci(1 - Wv) + Cj * Wv$$
$$Wu = u - ui, Wv = v - vi,$$

where  $Ci$ = a first interpolated color value
  $C_j$ = a second interpolated color value
  $C$ = the color texel at coordinate pair
    $(u, v)$
  $Wu$ = the distance in the $u$ direction
    between texel $C$ and coordinate $i$
  $Wv$ = the distance in the $v$ direction
    between texel $C$ and coordinate $i$ Based on these equations, the color texel C(u, v) is determined from interpolating the four neighboring integer texels C0, C1, C2, and C3, in the event that the (u, v) point is not an integer.

In FIG. 2, there is shown a prior art block diagram of a texel buffer 10 that stores data in a conventional sequence. The texel buffer 10 includes a first memory bank 11, a second memory bank 12, a third memory bank 13, and a fourth memory bank 14. Each of the memory banks 11–14 has an input coupled to a memory address signal MA and has an output coupled to a 64-bit bus 15. The first memory bank 11 stores a first set of texels, including coordinate pairs of (0, 0), (4, 0), (0, 1), (4, 1), (0, 2), (4, 2), (0, 3), and (4, 3). The second memory bank 12 stores a second set of texels, containing coordinate pairs of (1, 0), (5, 0), (1, 1), and (5, 1). The third memory bank 13 stores a third set of texels, including coordinate pairs of (2, 0), (6, 0), (2, 1), and (6, 1). The fourth memory bank stores a fourth set of texels, containing coordinate pairs of (3, 0), (7, 0), (3, 1), and (7, 1).

In this conventional structure, the texel buffer 10 needs to access the memory banks 11, 12, 13 and 14 multiple times in order to retrieve the four neighboring texels C0, C1, C2, and C3. For example, if a color texel falls within the four neighboring texels of C0(0, 0), C1(1, 0), C2(0, 1), and C3(1, 1), then the texel buffer 10 must perform two accesses to retrieve the four neighboring texels to interpolate the color texel C. During the first access, the texel buffer 10 retrieves the texel C0(0, 0) from the memory bank 11 and the texel C1(1, 0) from the memory bank 12. The texel buffer 10 will not be able to retrieve the texels (0, 1) and (1, 1) because both of these texels are stored in the memory banks 11 and 12, respectively. Only one access to a particular memory bank is permitted at a time. During the second cycle, the texel buffer 10 retrieves the texel C2(0, 1) from the memory bank 11 and the texel C3(1, 1) from the memory bank 12 to complete the retrieval process of the four neighboring texels. Under this scenario, the texel buffer 10 must perform two read cycles to retrieve the four neighboring texels because the memory bank 11 contains C0 and C2 texels and the bank 12 contains C1 and C3 texels, rather than storing each of the neighboring texels in separate memory banks for parallel access. Worst yet, if the texel buffer 10 attempts to retrieve texels C0(3,0), C1(4, 0), C2(3, 1), and C3(4, 1), then the texel buffer 10 must perform four read cycles to retrieve the four neighboring texels given that C0, C1, C2, and C3 are all stored in the same memory bank, i.e., the memory bank 14. In either illustrations, the minimum number of cycles to read the four neighboring texels is two. As a result, the overall system performance is degraded from the additional read cycles necessary to retrieve the four neighboring texels for interpolation of a color texel.

Accordingly, it is desirable to have a texel buffer that stores and retrieves the four neighboring integer texels in a single cycle to minimize the memory access time.

SUMMARY OF THE INVENTION

The present invention overcomes the foregoing limitations by providing a method for storing texels in memory banks that allows the retrieval of four neighboring texels within a single cycle. The four neighboring texels are stored in separate memory banks according to a predetermined set of combinations of 2-D (u, v) coordinate pairs. In interpolating a color pixel C(u, v), a texel buffer retrieves the four neighboring texels in a single cycle to speed up the memory access time. In one embodiment, a plurality of memory banks in the texel buffer are designed in an interleave mode. In an alternate embodiment, a plurality of memory banks in the texel buffer are implemented in a noninterleave mode. In both embodiments, a texel buffer retrieves the four neighboring texels of a color texel C(u, v) within a single cycle by storing texels in accordance to a predetermined set of criteria.

The present invention discloses a system, comprising: (1) a texel address generator for generating a color texel; (2) a texel buffer in a noninterleave mode, comprising: (a) a first memory bank for retrieving a first texel data, the first memory storing a plurality of texels in the combinations of (x=4n, y=2m) or (x=4n+2, y=2m+1), where n and m are integers; (b) a second memory bank for retrieving a second texel data, the second memory bank for storing a plurality of texels in the combinations of (x=4n+1, y=2m) or (x=4n+3, y=2m+1); (c) a third memory bank for retrieving a third texel data, the third memory bank for storing a third plurality of texels in the combinations of (x=4n+2, y=2m) or (x=4n, y=2m+1); (d) a fourth memory bank for storing a fourth texel data, the fourth memory bank storing a plurality of texels in the combinations of (x=4n+3, y=2m) or (x=4n+1, y=2m+1); wherein the first, second, third, and fourth texels forming a quadrilateral such that the color texel falls within the quadrilateral, each of the first, second, third, and fourth texels being of an integer coordinate that are not equal to the coordinate of the color texel.

A texel buffer in an interleave mode comprising: (1) a first memory bank for retrieving a texel data, the first memory storing a plurality of texels in the combinations of (x=4n, y=2m), where n and m are integers; (2) a second memory bank for retrieving a texel data, the first memory storing a plurality of texels in the combinations of (x=4n+2, y=2m+1), where n and m are integers; (3) a third memory bank for retrieving a texel data, the first memory storing a plurality of texels in the combinations of (x=4n+1, y=2m), where n and m are integers; (4) a fourth memory bank for retrieving a texel data, the first memory storing a plurality of texels in the combinations of (x=4n+3, y=2m+1), where n and m are integers; (5) a fifth memory bank for retrieving a texel data, the first memory storing a plurality of texels in the combinations of (x=4n+2, y=2m), where n and m are integers; (6) a sixth memory bank for retrieving a texel data, the first memory storing a plurality of texels in the combinations of (x=4n, y=2m+1), where n and m are integers; (7) a seventh memory bank for retrieving a texel data, the first memory storing a plurality of texels in the combinations of (x=4n+3, y=2m), where n and m are integers; (8) a eight memory bank for retrieving a texel data, the first memory storing a plurality of texels in the combinations of (x=4n+1, y=2m+1), where n and m are integers; wherein four texels of the first, second, third, fourth, fifth, sixth, seventh, and eighth texels forming a quadrilateral such that the color texel falls within the quadrilateral, each of the first, second, third, fourth, fifth, sixth, seventh, and eighth texels being of an integer coordinate that are not equal to the coordinate of the color texel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7a–7b are flow graphs showing the assertion of signals for the eight pixels in the interleave mode in a (u, v) texel coordinate having 11 control bits;

FIG. 11a is a schematic diagram of a swap circuit in re-arranging the order of four neighboring texels; and FIG. 11b is a block diagram showing the texel arrangement of B0, B1, B2, and B3 from the four memory banks.

DETAILED DESCRIPTION OF THE PREFERRED EMBODIMENT

Figure 3:
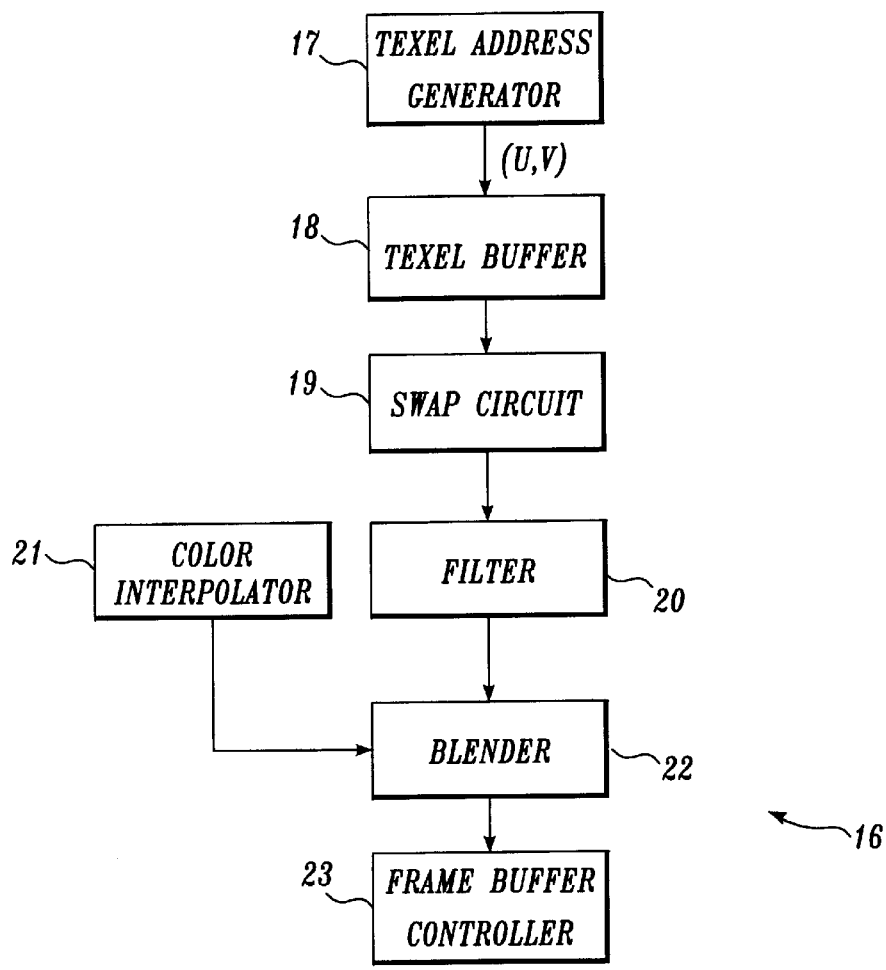
FIG. 3 is a general block diagram of a texture mapping architecture in generating texture map images of the present invention.

FIG. 3 is a general block diagram of a texture mapping architecture in generating texture map images of the present invention. The texture mapping architecture 16 includes a texel address generator 17, a texel buffer 18, a swap circuit 19, a filter 20, a color interpolator 21, a blender 22, and a frame buffer controller 23. The texel address generator 17 generates a coordinate of color texel for comparison with the texels stored in the texel buffer 18. The coordinate of texels stored in the texel buffer 18 are of integer numbers. If the color texel does not match one of the texels in the texel buffer 18, then a color interpolator 21 is required to interpolate the value of the color texel based on the four neighboring or surrounding texels relative to the coordinate of color texel in the texel buffer 18. The swap circuit 19 re-arranges the order of the texels received from the texel buffer 18 to re-align the texels in their respective positions. The filter 20 filters an image to a successively lower resolution. The blender 22 combines the interpolated texels, while the frame buffer controller 23 controls and displays the color texel.

Figure 4:
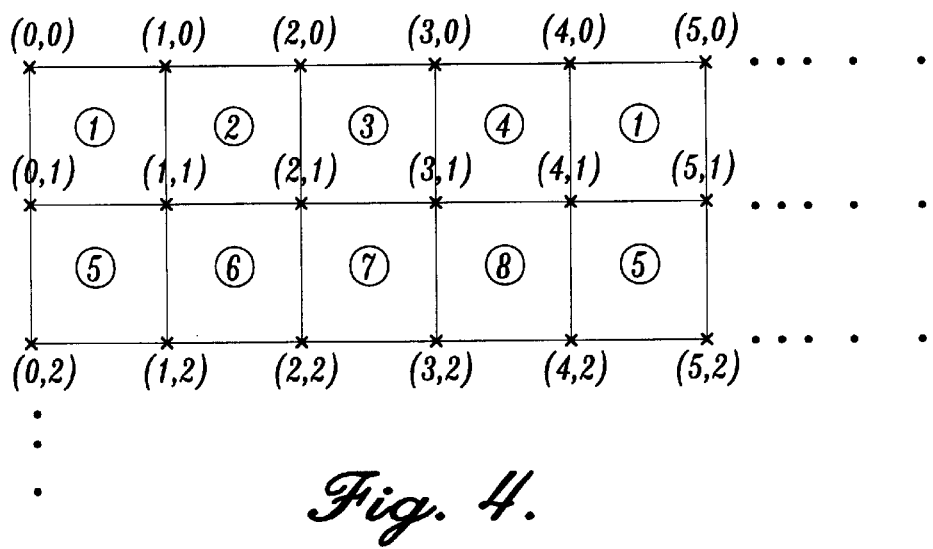
FIG. 4 is a coordinate diagram showing the eight possible locations of a color pixel of the present invention.

FIG. 4 is a coordinate diagram showing the eight possible locations of a color texel of the present invention. Eight color pixel positions are possible in the placement of a color pixel. The color pixel 1 falls within a quadrilateral of integer texels C0(0,0), C1(1,0), C2(0,1), and C3(1,1). The color pixel 2 is horizontally adjacent to the color pixel 1 and is positioned within a quadrilateral of integer texels C0(1,0), C1(2,0), C2(1,1), and C3(2,1). The color pixel 3 is horizontally adjacent to the color pixel 2 and falls within a quadrilateral of integer texels C0(2,0), C1(3,0), C2(2,1), and C3(3,1). The color pixel 4 is horizontally adjacent to the color pixel 3 and is positioned within a quadrilateral of integer texels C0(3,0), C1(4,0), C2(3,1), and C3(4, 1). The order of color pixels 1, 2, 3, 4 repeats in that sequence extending from and horizontally adjacent to the color pixel 4 as shown in FIG. 4. The color pixel 5 is vertically adjacent to the color pixel 1 and falls within a quadrilateral of integer texels C0(0,1), C(1, 1), C2(0,2), and C3(1,2). The color pixel 6 is horizontally adjacent to the color pixel 5 and is positioned within a quadrilateral of integer texels C0(1,1), C1(2,1), C2(1,2), and C3(2,2). The color pixel 7 is horizontally adjacent to the color pixel 6 and falls within a quadrilateral of integer texels C0(2,1), C1(3,1), C2(2,2), and C3(3,2). The color pixel 8 is horizontally adjacent to the color pixel 7 and is positioned within a quadrilateral of integer texels C0(3,1), C1(4,1), C2(3,2), and C3(4,2). The color pixels 5, 6, 7, and 8 repeat in that sequence extending from and horizontally adjacent to the color pixel 8 as depicted in FIG. 4.

Figure 5:
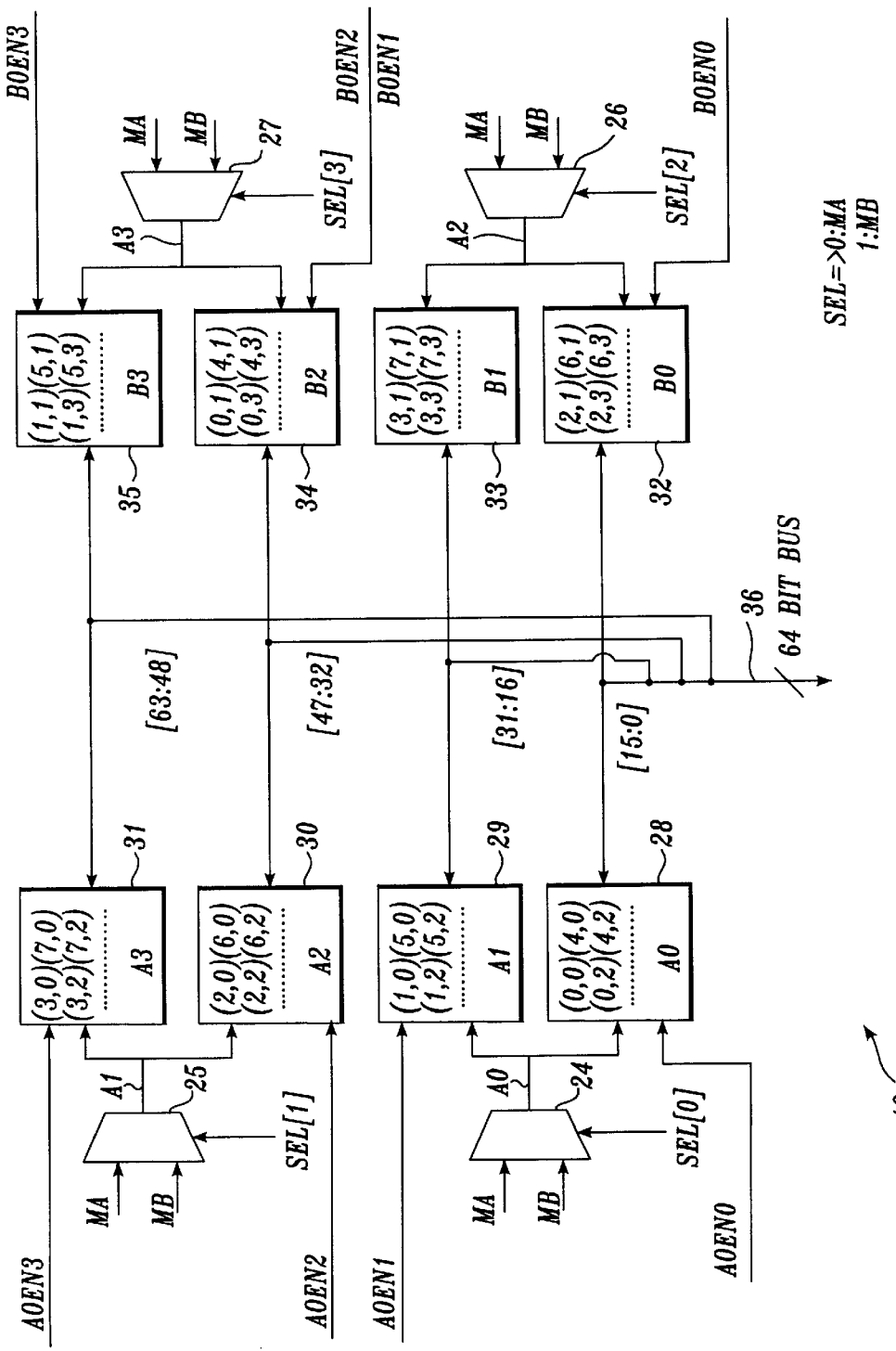
FIG. 5 is a schematic diagram of a texel buffer in the interleave mode of the present invention.

FIG. 5 is a schematic diagram of a texel buffer in the interleave mode of the present invention. The texel buffer 10 includes muxes 24–27, memory banks 28–35, and a 64-bit bus 36. The mux 24 is controlled by a first select signal SEL[0]. The mux 24 includes a first input for receiving a memory address MA signal, second input for receiving a memory address MB signal, and an output signal A0 coupled to the inputs of the memory banks 28 and 29. The mux 25 is controlled by a second select signal SEL[1]. The mux 25 has a first input for receiving the MA signal, a second input for receiving the MB signal, and an output A1 coupled to the inputs of the memory banks 30 and 31. The mux 26 is control by a third select signal SEL[2]. The mux 26 includes a first input for receiving the MA signal, a second input for receiving the MB signal, and an output A2 coupled to the inputs of memory banks 32 and 33. The mux 27 is controlled by a fourth select signal SEL[3]. The mux 27 has a first input for receiving the MA signal, a second input for receiving the MB signal, and an output A3 coupled to the inputs of the memory banks 34 and 35. When SEL[0], SEL[1], SEL[2], or SEL[3] sets to a value of logic "0," the MA signal is asserted at the respective one of multiplexers 24, 25, 26, or 27. When SEL[0], SEL[1], SEL[2], or SEL[3] sets to a value of logic "1", the MB signal is asserted at the respective one of the multiplexers 24, 25, 26, or 27.

To retrieve the four neighboring texels in a single cycle, memory banks 28–35 formed four dual interleaved pairs that supply four 16-bit data to the 64-bit bus 36. Each 16-bit data represents the storage information for one neighboring texel. The memory bank 28 or 32 provides the first 16-bit data [15:0]. The second 16-bit data [31:16] is retrieved from the memory bank 29 or 33. The memory bank 30 or 34 provides the third 16-bit data [47:32], while the fourth 16-bit data [63:48] is generated from the memory bank 31 or 35.

The memory bank 28 and the memory bank 32 form a first dual pair where a first 16-bit data [15:0] is retrieved from either the memory bank 28 or the memory bank 32. If the data is desired to be retrieved from the memory bank 28, the output enable signal for the memory bank 28, denoted by the symbol AOEN[0], is asserted. If the data is stored in the memory bank 32, the output enable signal for the memory bank 32, denoted by the symbol BOEN[0], is asserted. The 64-bit bus 36 is coupled to the memory banks 28 and 32 for receiving the first 16-bit data [15:0], depending on whether the AOEN[0] or BOEN[0] signal is asserted.

The memory bank 29 and the memory bank 33 form a second dual pair in which a second 16-bit data [31:16] is retrieved from the memory bank 29 or the memory bank 33. If the data is desired to be retrieved from either the memory bank 29, the output enable signal for the memory bank 29, denoted by the symbol AOEN[1], is asserted. If the data is stored in the memory bank 33, the output enable signal for the memory bank 33, denoted by the symbol BOEN[1], is asserted. The 64-bit bus 36 is coupled to the memory banks 29 and 33 for receiving the second 16-bit data [31:16], depending on whether the AOEN[1] and BOEN[1] signal is asserted.

The memory bank 30 and the memory bank 34 form a third dual pair where a third 16-bit data [47:32] is retrieved from either the memory bank 30 or the memory bank 34. If the desired data is stored in the memory bank 30, the output enable signal for the memory bank 30, denoted by the symbol AOEN[2], is asserted. If the data is stored in the memory bank 34, the output enable signal for the memory bank 34, denoted by the symbol BOEN[2], is asserted. The 64-bit bus 36 is coupled to the memory banks 30 and 34 for receiving the second 16-bit data [47:32], depending on whether the AOEN[2] and BOEN[2] signal is asserted.

The memory bank 31 and the memory bank 35 form a fourth dual pair in which a fourth 16-bit data [63:48] is retrieved from either the memory bank 31 or the memory bank 35. If the data is stored in the memory bank 31, the output enable signal for the memory bank 31, denoted by the symbol AOEN[3], is asserted. If the data is stored in the memory bank 35, the output enable signal for the memory bank 35, denoted by the symbol BOEN[3], is asserted. The 64-bit bus 36 is coupled to the memory banks 31 and 35 for receiving the fourth 16-bit data [63:48], depending on whether the AOEN[3] and BOEN[3] signal is asserted.

Texels must be stored in accordance with a predetermined set of conditions to permit four neighboring texels to be interleavely retrieved in a single cycle. In other words, memory banks 28–35 store texels in the x-axis and y-axis according to a predetermined set of combinations. For the first 16-bit data [15:0], the memory bank 28 stores texels in the combination of (x=4n, y=2m) which includes a set of texels containing coordinate pairs (0, 0), (4, 0), (0, 2), and (4,2), while the memory bank 32 stores texels in the combination of (x=4n+2, y=2m+1) which includes a set of texels containing coordinate pairs (2, 1), (6, 1), (2, 3), and (6, 3). The symbols m and n denote integer numbers. As for the second 16-bit data [31:16], the memory bank 29 stores texels in the combination of (x=4n+1, y=2m) which includes a set of texels containing coordinate pairs (1, 0), (5, 0), (1, 2), and (5, 2), while the memory bank 33 stores texels in the combination of (x=4n+3, y=2m+1) that includes a set of texels containing coordinate pairs (3, 1), (7, 1) (3, 3), and (7, 3). For the third 16-bit data [47:32], the memory bank 30 stores texels in the combination of (x=4n+2, y=2m) which includes a set of texels containing coordinate pairs (2, 0), (6, 0), (2, 2) and (6, 2), while the memory bank 33 stores texels in the combination of (x=4n, y=2m+1) that includes a set of texels containing coordinate pairs (0, 1), (4, 1), (0, 3), and (4, 3). On the fourth 16-bit data [63:48], the memory bank 31 stores texels in the combination of (x=4n+3, y=2m) which includes a set of texels containing coordinate pairs (3, 0), (7, 0), (3, 2), and (7, 2), while the memory bank 35 stores texels in the combination of (x=4n+1, y=2m+1) which includes a set of texels containing coordinate pairs (1, 1), (5, 1), (1, 3), and (5, 3).

Figure 6A:
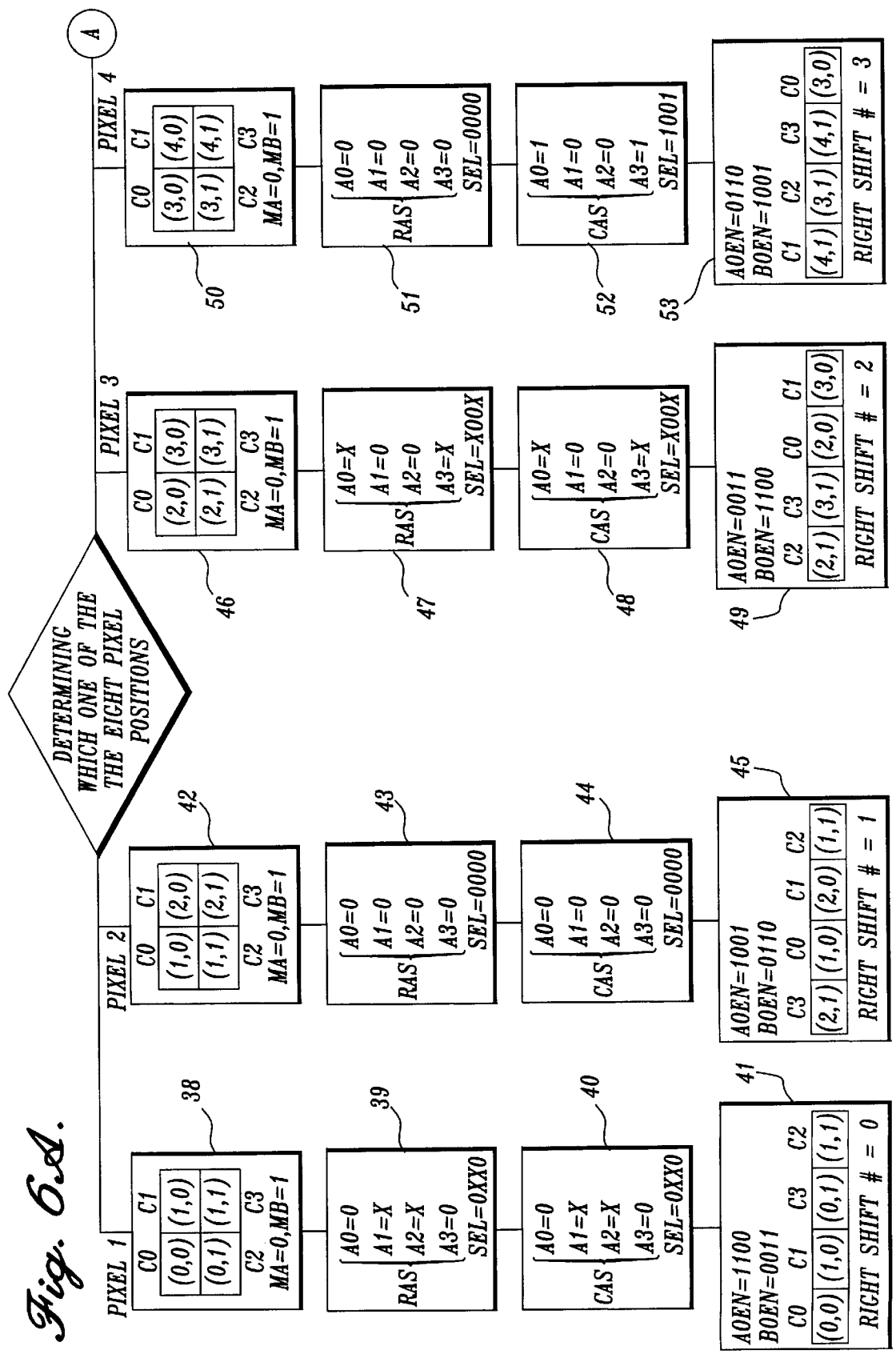
FIGS. 6a–6b are flow graphs showing the assertion of signals for the eight pixels in the interleave mode.
Figure 6B:
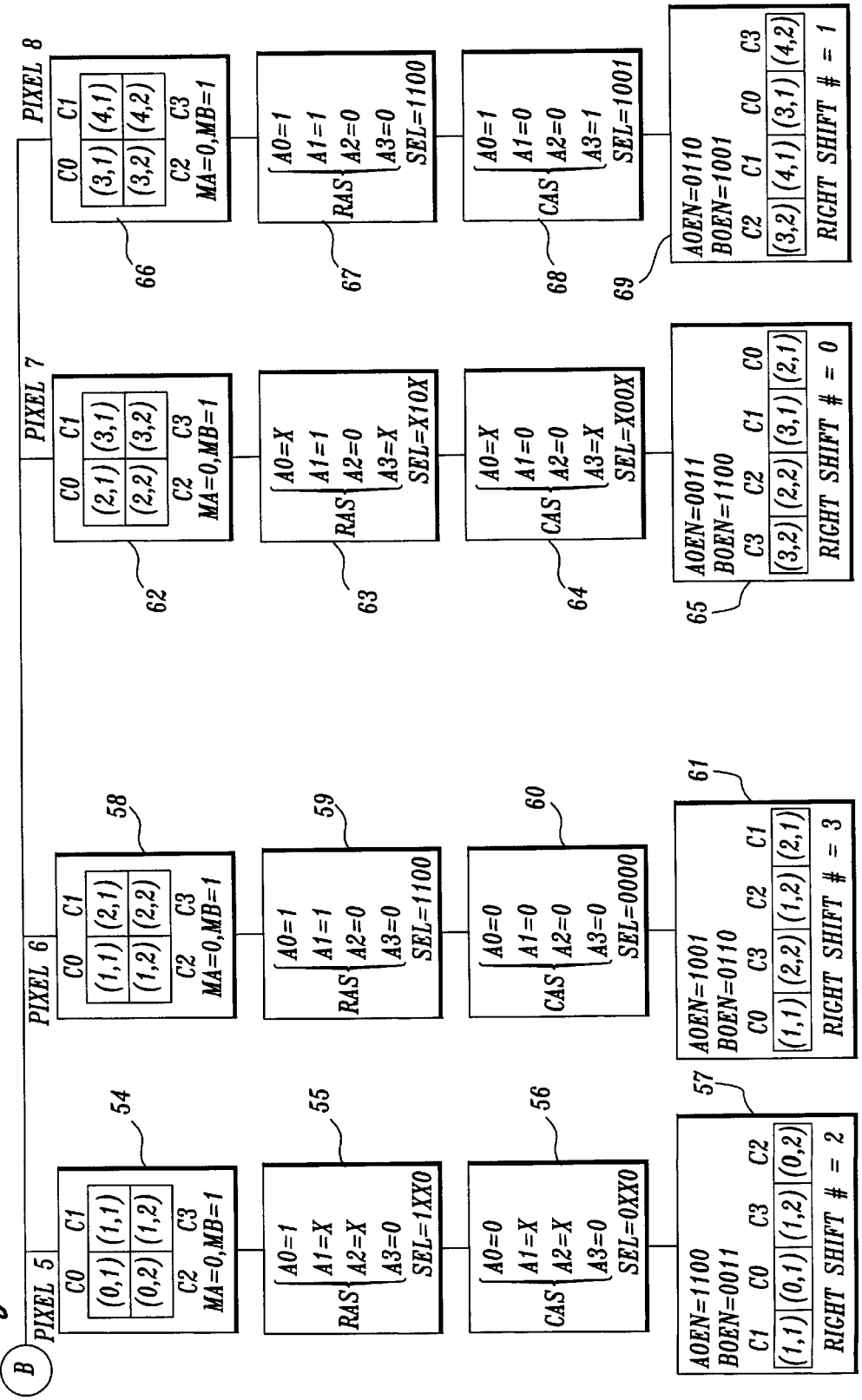

FIGS. 6a–6b are flow graphs showing the assertion of signals for the eight pixels in the interleave mode. For each pixel, a corresponding set of signals are asserted to retrieve the four neighboring texels from the memory banks 28–35 in FIG. 5. At a step 37, the texel buffer 18 determines where the color pixel falls within the eight possible positions as shown in FIG. 4. To retrieve the color pixel 1 that falls within a quadrilateral of the texels C0(0, 0), C1(1, 0), C2(0, 1), and C3(1, 1), the texel buffer 18 executes steps 38–41. At the step 38, the texel buffer 18 sets the MA signal to a logic "0" state and sets the MB signal to a logic "1" state. At steps 38 and 39, the RAS and CAS signals enable the output signal A0 of the mux 24 and the output signal A3 of the mux 27 to activate memory banks 28–29 and memory banks 34–35, where a first SEL signal sets a string of binary numbers to 0xx0 for RAS and a second SEL signal sets a string of binary numbers to 0xx0 for CAS. At the step 41, the texel buffer sets AOEN to 1100 to assert the AOEN[0] signal to retrieve the texel C0(0, 0) and assert the AOEN[1] signal to retrieve the texel C1(1,0). At the step 41, the texel buffer sets BOEN to 0011 to assert the BOEN[2] signal to retrieve the texel C2(0,1) and assert BOEN[3] signal to retrieve the texel C3(1,1). A right shift signal is set to a value of zero because the texels are already in their respective positions of C0, C1, C2, and C3.

At the step 37, if the texel buffer 18 determines that the color pixel falls with the pixel 2 position of a quadrilateral of integer texels C0(1, 0), C1(2, 0), C2(1, 1), and C3(2, 1), the texel buffer 18 executes steps 42–45. At the step 42, the texel buffer 18 sets the MA signal to a logic "0" state and sets the MB signal to a logic "1" state. At steps 43 and 44, the RAS and CAS signals set the output signals A0, A1, A2, and A3 of the muxes 24–27 to a logic "0" state, where the first SEL signal sets a string of binary numbers 0000 for RAS and the second SEL signal sets a string of binary numbers 0000 for CAS. At the step 45, the texel buffer 18 sets AOEN to 1001 to assert the AOEN[1] signal to retrieve the texel C0(1, 0) and to assert the AOEN[2] signal to retrieve the texel C1(2,0). At the step 45, the texel buffer sets BOEN to 0110 to assert the BOEN[0] signal to retrieve the texel C3(2,1) and to assert BOEN[3] signal to retrieve the texel C2(1,1). The right shift signal is set to a value of one to shift the positions of the four neighboring texels in the sequence of C3, C0, C1 and C2.

If the texel buffer 18 at the step 37 determines that the color pixel falls with the pixel 3 position of a quadrilateral of integer texels C0(2, 0), C1(3, 0), C1(2, 1), and C3(3, 1), the texel buffer 18 executes steps 46–49. At the step 46, the texel buffer 18 sets the MA signal to a logic "0" state and sets the MB signal to a logic "1" state. At steps 47 and 48, the RAS and CAS signals set the output signal A1 of the mux 25 and the output signal A2 of the mux 26 to a logic "0" state, where the first SEL signal sets a string of binary numbers x00x for RAS and the second SEL signal sets a string of binary numbers x00x for CAS. At the step 49, the texel buffer 18 sets AOEN to 0011 to assert the AOEN[2] signal to retrieve the texel C0(2, 0) and assert the AOEN[3] signal to retrieve the texel C1(3,0). At the step 49, the texel buffer sets BOEN to 1100 to assert the BOEN[0] signal to retrieve the texel C2(2, 1) and assert BOEN[1] signal to retrieve the texel C3(3,1). The right shift signal is set to a value of two to shift the positions of the four neighboring texels in the sequence of C2, C3, C0, and C1.

To retrieve the pixel 4 position within a quadrilateral of integer texels C0(3, 0), C1(4, 0), C2(3, 1), and C3(4,1), the texel buffer 18 executes steps 50–53. At the step 50, the texel buffer 18 sets the MA signal to a logic "0" state and sets the MB signal to a logic "1" state. At the step 51, the RAS signal sets the output signals A0, A1, A2, and A3 of the muxes 24–27 to a logic "0" state, where the first SEL signal sets a string of binary numbers 0000 for RAS. At the step 52, the CAS signal sets the output signals A0 and A3 of the muxes 24 and 27 to a logic "1" state while setting the output signals A1 and A2 of the muxes 25 and 26 to a logic "0" state, where the second SEL signal sets a string of binary numbers 1001 for CAS. At the step 53, the texel buffer 18 sets AOEN to 0110 to assert the AOEN[0] signal to retrieve the texel C1(4, 0) and assert the AOEN[3] signal to retrieve the texel C0(3,0). Also at the step 49, the texel buffer sets BOEN to 1001 to assert the BOEN[1] signal to retrieve the texel C2(3,1) and assert the BOEN[2] signal to retrieve the texel C3(4,1). The right shift signal is set to a value of three to shift the positions of the four neighboring texels in the sequence of C1, C2, C3 and C0.

At the step 37, if the texel buffer 18 determines the color pixel falls with the pixel 5 position of a quadrilateral of integer texels C0(0, 1), C1(1, 1), C2(0, 2), and C3(1, 2), the texel buffer 18 executes steps 54–57. At the step 54, the texel buffer 18 sets the MA signal to a logic "0" state and sets the MB signal to a logic "1" state. At steps 55 and 56, the RAS signal sets the output signals A0 of the mux 24 to a logic "1" state and sets the output signal A3 of the mux 27 to a logic "0" state, where the first SEL signal sets a string of binary numbers 1xx0 for RAS and the second SEL signal sets a string of binary numbers 0xx0 for CAS. At the step 57, the texel buffer 18 sets AOEN to 1100 to assert the AOEN[0] signal to retrieve the texel C2(0, 2) and assert the AOEN[1] signal to retrieve the texel C3(1, 2). At the step 57, the texel buffer 18 sets BOEN[3:0] to 0011 to assert BOEN[2] to retrieve the texel C0(0,1) and assert BOEN[3] signal to retrieve the texel C1(1, 1). The right shift signal is set to a value of two to shift the positions of the four neighboring texels in the sequence of C2, C3, C0, and C1.

If the texel buffer 18 at the step 37 determines that the color pixel falls within the pixel 6 position of a quadrilateral of integer texels C0(1, 1), C1(2, 1), C2(1, 2), and C3(2, 2), the texel buffer 18 executes steps 58–61. At the step 58, the texel buffer 18 sets the MA signal to a logic "0" state and sets the MB signal to a logic "1" state. At the step 59, the RAS signal sets the output signals A0 and A1 of the mux 24 and 25 to a logic "1" state and sets the output signals A2 and A3 of the muxes 26 and 27 to a logic "0" state, where the first SEL signal sets a string of binary numbers 1100 for RAS. At the step 60, the RAS signal sets the output signals A0, A1, A2, and A3 of the muxes 24–27 to a logic "0" state, where the second SEL signal sets a string of binary numbers to 0000 for CAS. At the step 61, the texel buffer 18 sets AOEN to 1001 to assert the AOEN[1] signal to retrieve the texel C2(1, 2) and assert the AOEN[2] signal to retrieve the texel C3(2, 2). At the step 61, the texel buffer 18 sets BOEN[3:0] to 0110 to assert the BOEN[0] signal to retrieve texel C1(2,1) and assert BOEN[3] signal to retrieve the texel C0(1, 1). The right shift signal is set to a value of three to shift the positions of the four neighboring texels in the sequence of C1, C2, C3 and C0.

To retrieve the pixel 7 position within a quadrilateral of integer texels C0(2, 1), C1(3, 1), C2(2, 2), and C3(3, 2), the texel buffer 18 executes steps 62–65. At the step 62, the texel buffer 18 sets the MA signal to a logic "0" state and sets the MB signal to a logic "1" state. At the step 63, the RAS signal sets the output signals A1 of the mux 25 to a logic "1" state and sets the output signal A2 to a logic "0" state, where the first SEL signal sets a string of binary numbers x10x for RAS. At the step 64, the CAS signal sets the output signals A1 and A2 to a logic "0" state, where the second SEL signal sets a string of binary numbers x00x for CAS. At the step 65, the texel buffer 18 sets AOEN to 0011 to assert the AOEN[2] signal to retrieve the texel C2(2, 2) and assert the AOEN[3] signal to retrieve the texel C3(3, 2). At the step 65, the texel buffer 18 sets BOEN[3:0] to 1100 to assert the BOEN[0] signal to retrieve the texel C0(2, 1) and assert BOEN[1] signal to retrieve the texel C1(3, 1). The right shift signal is set to a value of zero because the texels are already in their respective positions of C0, C1, C2, and C3.

To retrieve the pixel 8 position within a quadrilateral of integer texels C0(3, 1), C1(4, 1), C2(3, 2), and C3(4, 2), the texel buffer 18 executes steps 66–69. At the step 66, the texel buffer 18 sets the MA signal to a logic "0" state and sets the MB signal to a logic "1" state. At the step 67, the RAS signal sets the output signals A0 and A1 of the muxes 24 and 25 to a logic "1" state and sets the output signals A2 and A3 of the muxes 26 and 27 to a logic "0" state, where the first SEL signal sets a string of binary numbers 1100 for RAS. At the step 68, the CAS signal sets the output signals A0 and A3 of the muxes 24 and 27 to a logic "1" state and sets the output signals A1 and A2 of the muxes 25 and 26 to a logic "0" state, where the second SEL signal sets a string of binary numbers 1001 for CAS. At the step 69, the texel buffer 18 sets AOEN to 0110 to assert the AOEN[0] signal to retrieve the texel C3(4, 2) and assert the AOEN[3] signal to retrieve the texel C2(3, 2). At the step 69, the texel buffer 18 sets BOEN[3:0] to 1001 to assert the BOEN[2] signal to retrieve the texel C0(3, 1) and assert BOEN[2] signal to retrieve the texel C1(4, 1). The right shift signal is set to a value of one to shift the positions of the four neighboring texels in the sequence of C3, C0, C1, and C2.

Figure 7A:
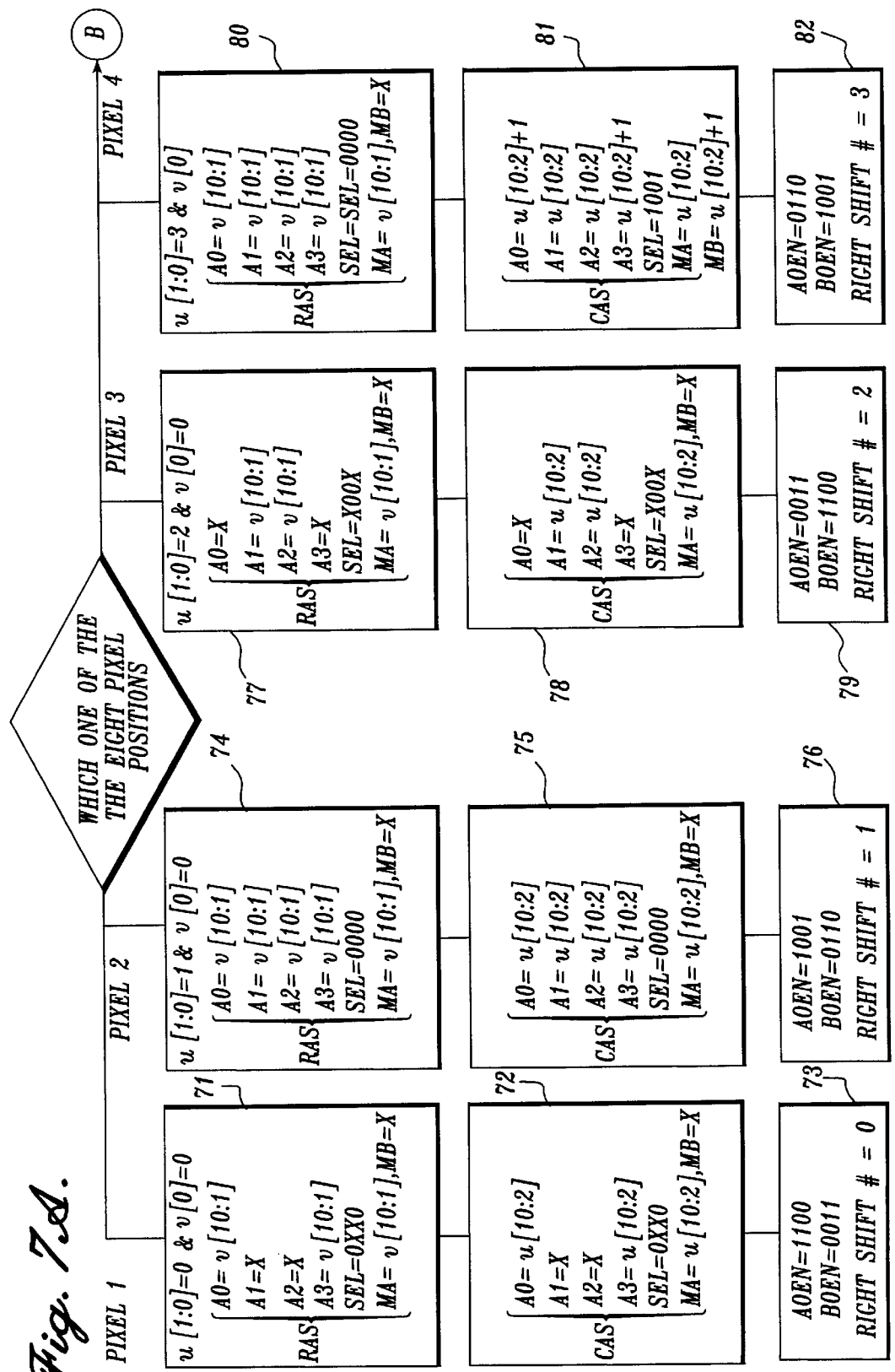

FIGS. 7a–7b are flow graphs showing the assertion of signals for the eight pixels in the interleave mode in a (u, v) texel coordinate having 11 control bits. At a step 70, the texel buffer 18 determines the location of where the color texel falls within the range of eight possible pixels as shown in FIG. 4. After the color texel is determined to fall within the pixel 1, 2, 3, 4, 5, 6, 7, or 8, a corresponding plurality of signals are set to trigger the retrieval of the corresponding four neighboring texels within a single cycle to compute the value of the color texel. At a step 71 for a pixel 1 with u[1:0]=0 and v[0]=0, the RAS signal sets the output signal A0 of the mux to v[10:1], sets the output signals A1 and A2 of the muxes 25 and 26 to a logic "x" or "don't care" state, sets the output signal A3 of the mux 27 to v[10:1], and sets the SEL signal to a string of binary numbers 0xx0. The MA signal is set to v[10: 1] while the MB signal is asserted to an "x" state. At a step 72, the CAS signal sets the output signal A0 to u[10:2], sets the output signals A1 and A2 to an "x" state, sets the output signal A3 of the mux to u[10:2], and sets the SEL signal to a string of binary numbers 0xx0. The MA signal is set to u[10:2] while the MB signal is asserted to an "x" state. At a step 73, the AOEN signal is set to a string of binary numbers 1100, the BOEN signal is set to a string of binary numbers 0011, and the right shift signal is set to zero.

At a step 74 for a pixel 2 with u[1:0]=1 and v[0]=0, the RAS signal sets the output signals A0, A1, A2, and A3 of the mux 24, 25, 26, and 27 to v[10:1] and sets the SEL signal to a string of binary numbers 0000. The MA signal is set to v[10:1] while the MB signal is asserted to an "x" state. At a step 75, the CAS signal sets the output signals A0, A1, A2, and A3 of the muxes 24, 25, 26, and 27 to u[10:2], and sets the SEL signal to a string of binary numbers of 0000. The MA signal is set to u[10:2] while the MB signal is asserted to an "x" state. At a step 76, the AOEN signal is set to 1001, the BOEN signal is set to 0110, and the right shift signal is set to a numerical value of one.

At a step 77 for a pixel 3 with u[1:0]=2 and v[0]=0, the RAS signal asserts the output signals A0 and A3 of the mux 24 and 27 to an "x" state, sets the output signals A1 and A2 of the muxes 25 and 26 to v[10:1], and sets the SEL signal to a string of binary numbers of x00x. The MA signal is set to v[10:1] while the MB signal is asserted to an "x" state. At a step 78, the CAS signal asserts the output signals A0 and A3 of the muxes 24 and 27 to a logic "x" state, sets the output signals A1 and A2 of the muxes 25 and 26 to u[10:2], and sets the SEL signal to a string of binary numbers x00x. The MA signal is set to u[10:2] while the MB signal is asserted to an "x" state. At a step 79, the AOEN signal is set to 0011, the BOEN signal is set to 1100, and the right shift signal is set to a numerical value of two.

At a step 80 for a pixel 4 with u[1:0]=3 and v[0]=0, the RAS signal sets the output signals A0, A1, A2, and A3 of the muxes 24, 25, 26, and 27 to v[10:1], and sets the SEL signal to a string of binary numbers 0000. The MA signal is set to v[10:1] while the MB signal is asserted to an "x" state. At a step 81, the CAS signal sets the output signals A0 and A3 of the muxes 24 and 27 to a u[10:2]+1, sets the output signals A1 and A2 of the muxes 25 and 26 to u[10:2], and sets the SEL signal to a string of binary numbers 1001. The MA signal is set to u[10:2] while the MB signal is set to u[10:2]+1. At a step 82, the AOEN signal is set to 0110, the BOEN signal is set to 1001, and the right shift signal is set to a numerical value of three.

At a step 83 for a pixel 5 with u[1:0]=0 and v[0]=1, the RAS signal sets the output signal A0 of the mux to v[10:1]+1, asserts the output signals A1 and A2 of the muxes 25 and 26 to an "x" state, sets the output signal A3 of the mux 27 to v[10:1], and sets the SEL signal to a string of binary numbers 1xx0. The MA signal is set to v[10:1] while the MB signal is set to v[10:1]+1. At a step 84, the CAS signal sets the output signal A0 to u[10:2], asserts the output signals A1 and A2 to an "x" state, sets the output signal A3 of the mux to u[10:2], and sets the SEL signal to a string of binary numbers 0xx0. The MA signal is set to u[10:2] and the MB signal is asserted to an "x" state. At a step 85, the AOEN signal is set to 1100, the BOEN signal is set to 0011, and the right shift signal is set to a numerical value of two.

At a step 86 for a pixel 6 with u[1:0]=1 and v[0]=1, the RAS signal sets the output signals A0 and A1 of the muxes 24 and 25 to v[10:1]+1, sets the output signals A2 and A3 of the muxes 26 and 27 to a v[10:1], and sets the SEL signal to a string of binary numbers 1100. The MA signal is set to v[10: 1] while the MB signal is set to v[10:1]+1. At a step 87, the CAS signal sets the output signals A0, A1, A2, and A3 of the muxes 24, 25, 26, and 27 to u[10:2] and sets the SEL signal to 0000. The MA signal is set to u[10:2] while the MB signal is asserted to an "x" state. At a step 88, the AOEN signal is set to 1001, the BOEN signal is set to 0110, and the right shift signal is set to a numerical value of three.

At a step 89 for a pixel 7 with u[1:0]=2 and v[0]=1, the RAS signal asserts the output signals A0 and A3 of the muxes 24 and 27 to a logic "x" state, sets the output signal A1 of the muxes 25 to v[10:1]+1, and sets the output signal A2 of the mux 26 to v[10:1], and sets the SEL signal to a string of binary numbers of a string of binary numbers x10x. The MA signal is set to v[10:1] while the MB signal is set to v[10:1]+1. At a step 90, the CAS signal sets the output signals A0 and A3 to a logic "x" state, sets the output signals A1 and A2 of the muxes 25 and 26 to u[10:2], and sets the SEL to x00x. The MA signal is set to u[10:2] while the MB signal is set to a logic "x" state. At a step 91, the AOEN signal is set to 0011, the BOEN signal is set to 1100, and the right shift signal is set to a numerical value of zero.

At a step 92 for a pixel 8 with u[1:0]=3 and v[0]=1, the RAS signal sets the output signals A0 and A1 of the muxes 24 and 25 to v[10:1]+1, sets the output signals A2 and A3 of the muxes 26 and 27 to v[10:1], and sets the SEL signal to 1100. The MA signal is set to v[10:1] while the MB signal is set to v[10:1]+1. At a step 93, the CAS signal sets the output signals A0 and A3 of the muxes 24 and 27 to u[10:2]+1, sets the output signals A1 and A2 of the muxes 25 and 26 to u[10:2], and sets the SEL to a string of binary numbers 1001. The MA signal is set to u[10:2] while the MB signal is set to u[10:2]+1. At a step 94, the AOEN signal is set to 0110, the BOEN signal is set to 1001, and the right shift signal is set to a numerical value of one.

Figure 8:
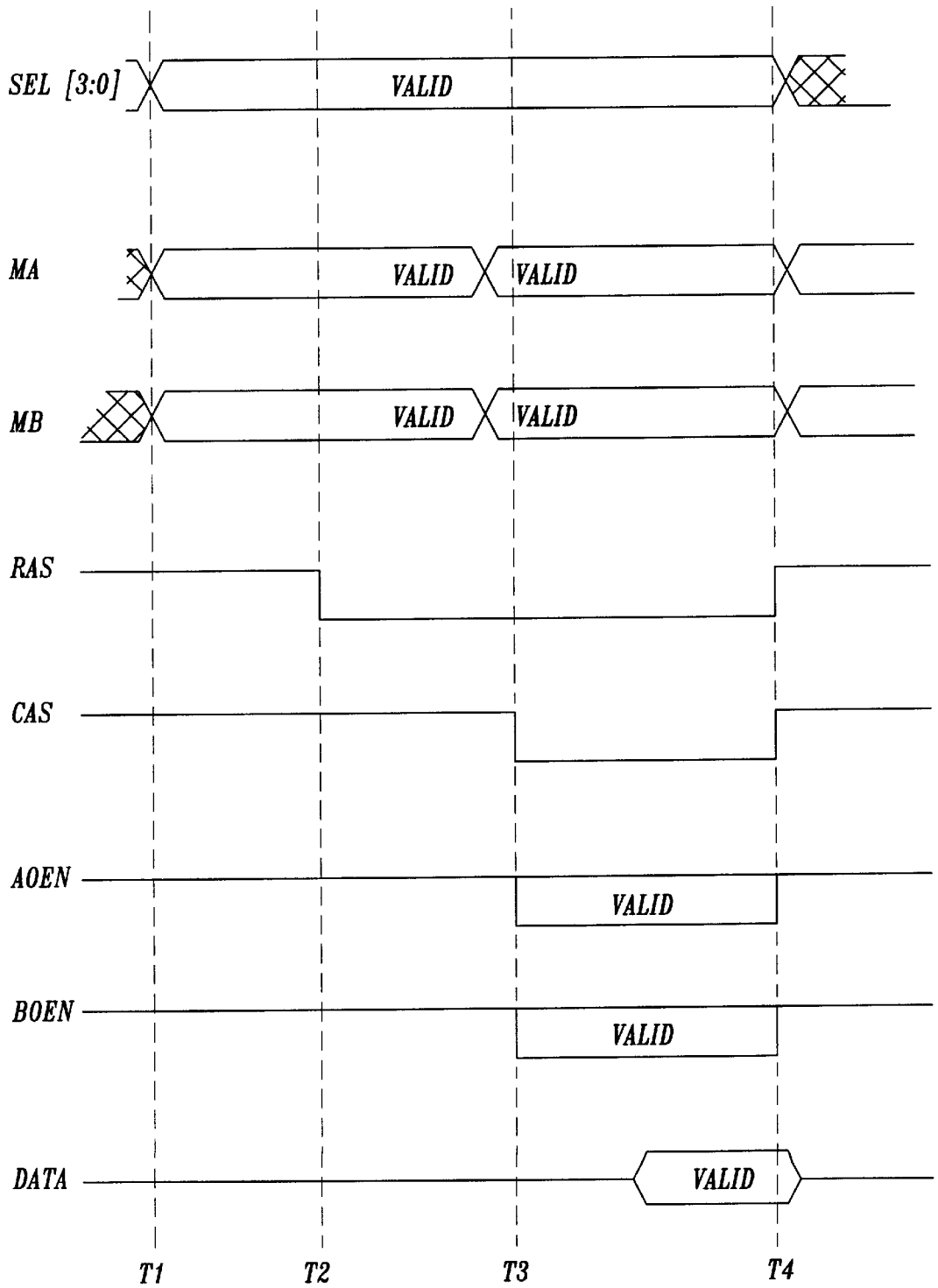
FIG. 8 is a timing diagram showing the waveform relationship of the signals in the texel buffer.

FIG. 8 is a timing diagram showing the waveform relationship of the signals in the texel buffer. Prior to the start of T1, the SEL, MA, and MB signals are asserted and generated to the muxes 24–27 as shown in steps 71, 74, 77, 80, 83, 86, 89 and 92 in FIGS. 7a–b. Before the occurrence of T2, the SEL, MA, and MB signals asserts addresses A0–A3 within the setup time of the memories 28–35 of FIG. 5 while the RAS changes from a logic "1" to a logic "0" state. Prior to T3, two events occurred. First, while SEL, MA, and MB signals assert the addresses A0–A3 within the hold time requirement of the memories 28–35, another set of valid SEL, MA, and MB signals are asserted and generated to the output of the muxes 24–27 as described in steps 72, 75, 78, 81, 84, 87, 90 and 93 in FIG. 5. Secondly, while SEL, MA, and MB signals assert the addresses A0–A3 within the setup time requirement of the memories 28–35, the CAS signal changes from a logic "1" to a logic "0" state. At T3, valid AOEN and BOEN signals are generated to the memories 28–35 as described in steps 73, 76, 79, 82, 85, 88, 91 and 94. At T4 where the memories 28–35 have generated valid data to the bus 36 and hold the data for an access time period, the SEL, MA, MB, RAS, CAS, AOEN, and BOEN signals can be unasserted.

Figure 1:
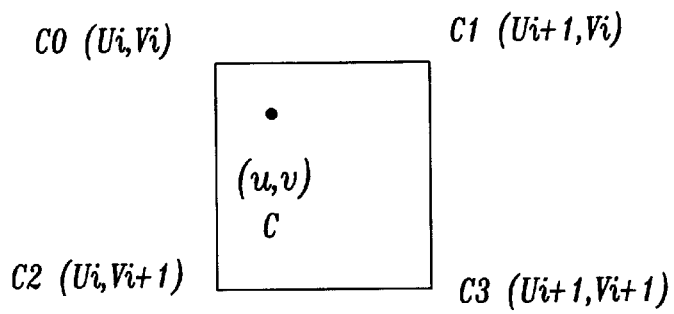
FIG. 1 is a prior art spatial diagram of interpolating four neighboring integer texels to obtain the value of a color texel in a (u, v) texture coordinate space.
Figure 2:
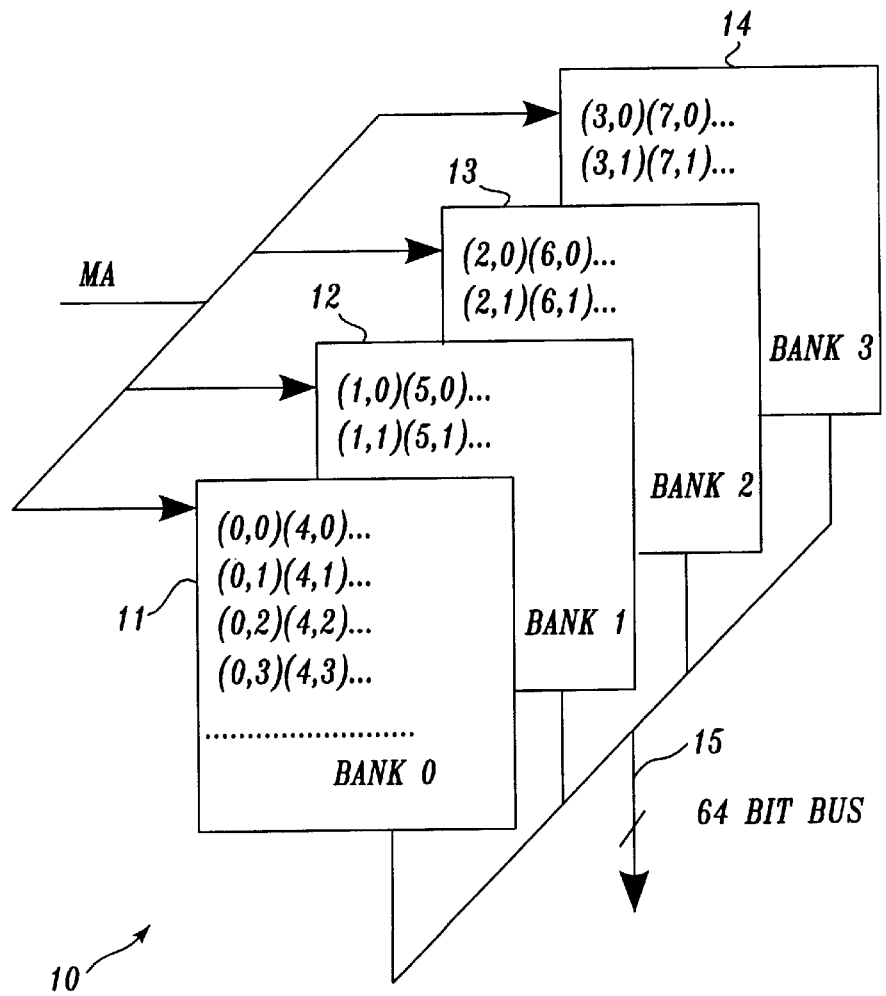
FIG. 2 is a prior art block diagram of a texel buffer that stores data in a conventional sequence.
Figure 9:
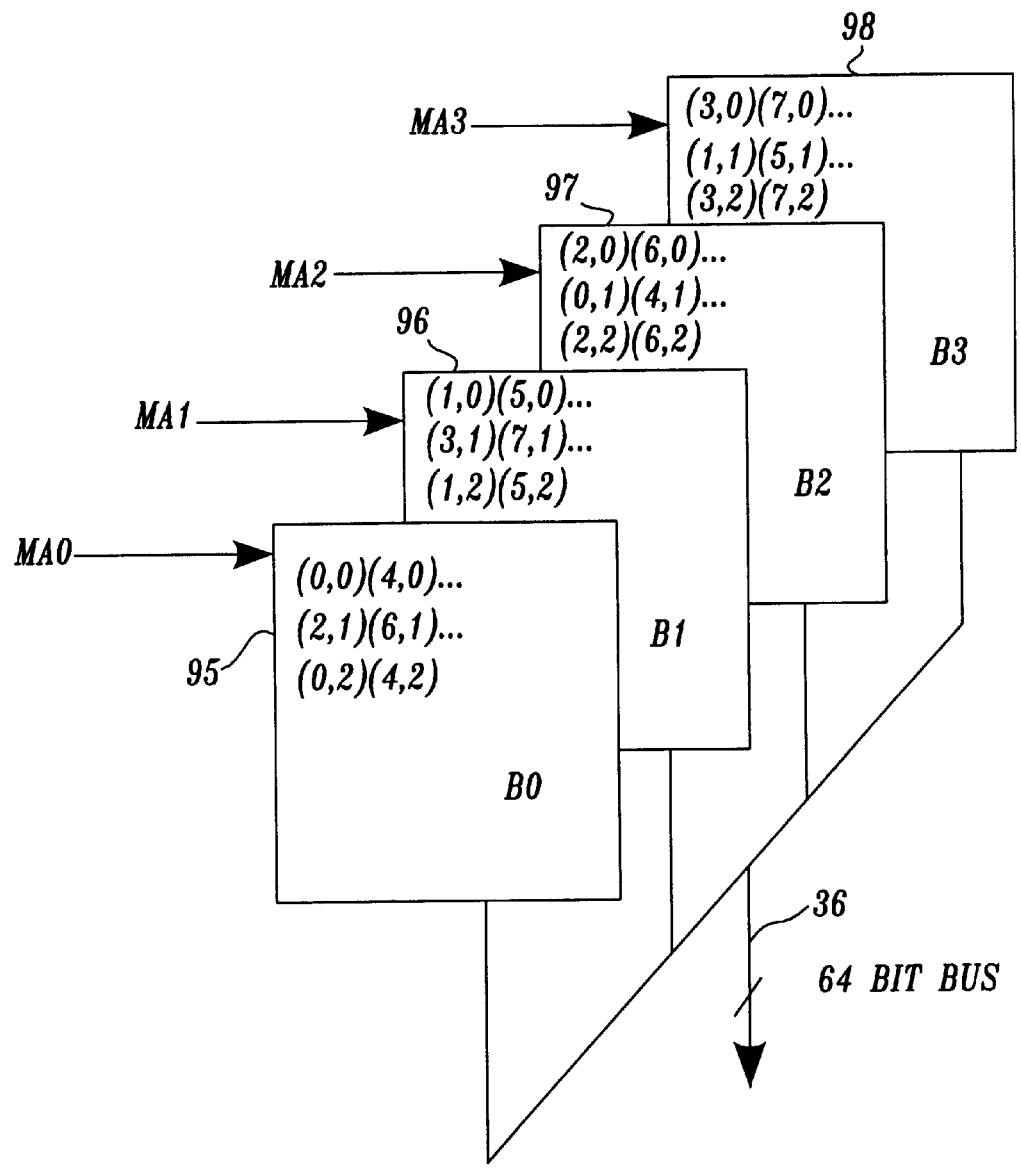
FIG. 9 is a schematic diagram of the texel buffer in a noninterleave mode coupled to a 64-bit bus.

FIG. 9 is a schematic diagram of the texel buffer in a noninterleave mode coupled to a 64-bit bus 36. Memory banks 95, 96, 97, and 98 are coupled to the 64-bit bus 36 for the retrieval of the four neighboring texels C0, C1, C2, and C3. Each of the memory banks 95–98 is controlled by a memory address signal of MA0, MA1, MA2 or MA3. The MA0 signal controls the texel to be retrieved from the memory bank 95, the MA1 signal controls the texel to be retrieved from the memory bank 96, the MA2 signal controls the texel to be retrieved from the memory bank 97, and the MA3 signal controls the texel to be retrieved from the memory bank 98. In the noninterleave mode, the retrieval of the 64-bit data is obtained by retrieving a 16-bit data from each of the memory banks 95, 96, 97, and 98. Even though the noninterleave mode is designed with the four memory banks 95, 96, 97, and 98, similar to the prior art architecture in FIG. 2 which was also designed with the four memory banks 11, 12, 13, and 14, the storage sequence of data in the present inventions in the memory banks 95, 96, 97, and 98 differs from the storage sequence in the memory banks 11, 12, 13, and 14. The memory bank 95 stores coordinate pairs in the combinations of (x=4n, y=2m) and (x=4n+2, y=2m +1), resulting in data storage of (0, 0), (4, 0), (2, 1), (6, 1), (0, 2), (4, 2), comparing to the memory bank 11 which stores (0, 0), (4, 0), (0, 1), (4, 1), (0, 2), (4, 2), (0, 3), and (4, 3). The memory bank 96 stores coordinate pairs in the combinations of (x=4n+1, y=2m) or (x=4n+3, y=2m+1), resulting in data storage of (1, 0), (5, 0), (3, 1), (7, 1), (1, 2), and (5, 2), whereas the memory bank 12 contains data of (1, 0), (5, 0), (1, 1), and (5, 1). The memory bank 97 stores coordinate pairs in the combinations of (x=4n+2, y=2m) or (x=4n, y=2m+1), resulting in data storage of (2, 0), (6, 0), (0, 1), (4, 1), (2, 2), and (6, 2), comparing to the memory bank 13 which stores (2, 0), (6, 0), (2, 1), and (6, 1). The memory bank 98 stores coordinate pairs in the combinations of (x=4n+3, y=2m) or (x=4n+1, y=2m+1), resulting in data storage of (3, 0), (7, 0), (1, 1), (5, 1), comparing to the memory bank 19 which stores (3, 0), (7, 0), (3, 1), and (7, 1). The storage sequence of the noninterleave mode stores each of the form neighboring texels in separate memory banks 95, 96, 97, and 98 to enable the texel buffer 18 to retrieve the four neighboring texels in a single cycle.

Figure 10A:
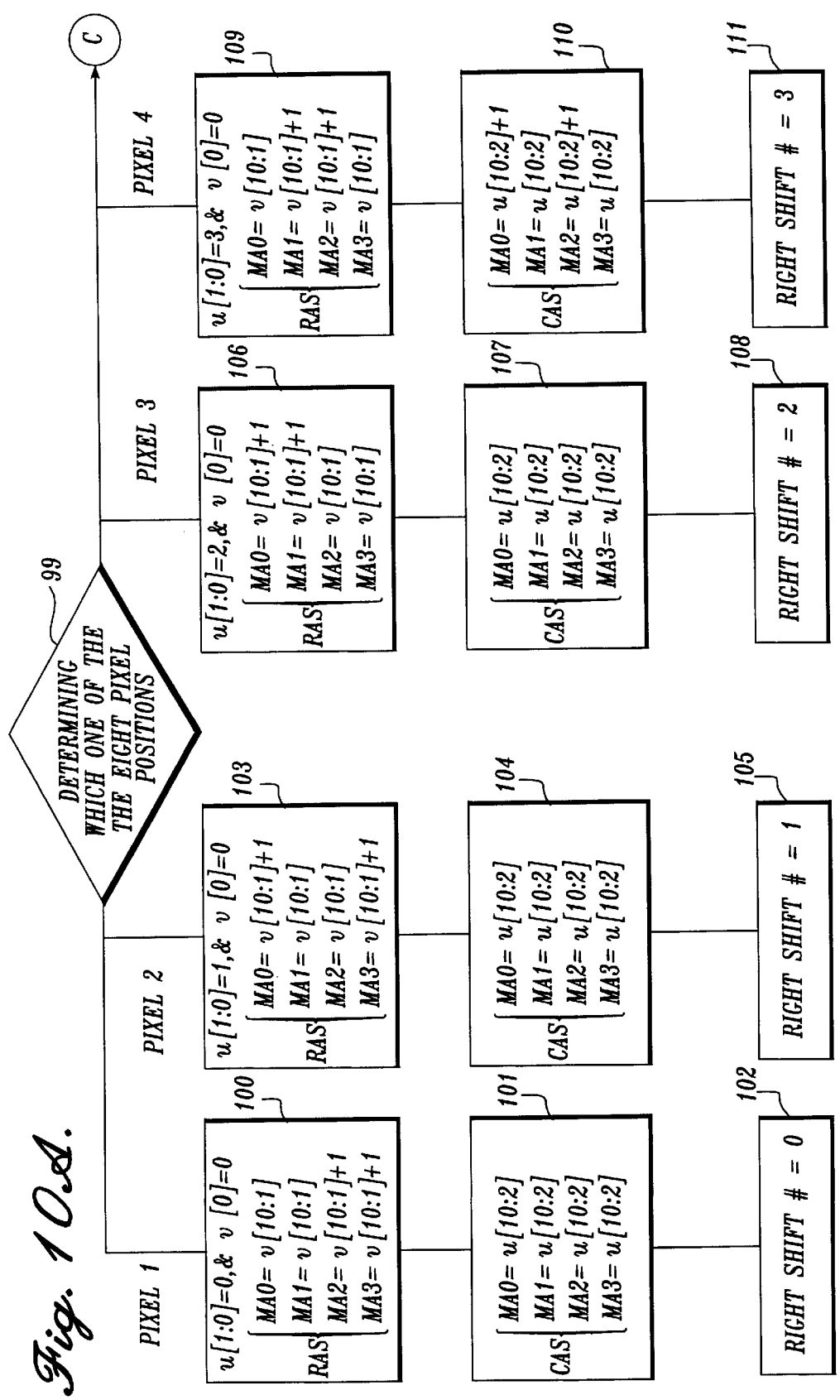
FIGS. 10a–b are the flow graphs showing the assertion of signals for the eight pixels in a noninterleave mode.
Figure 10B:
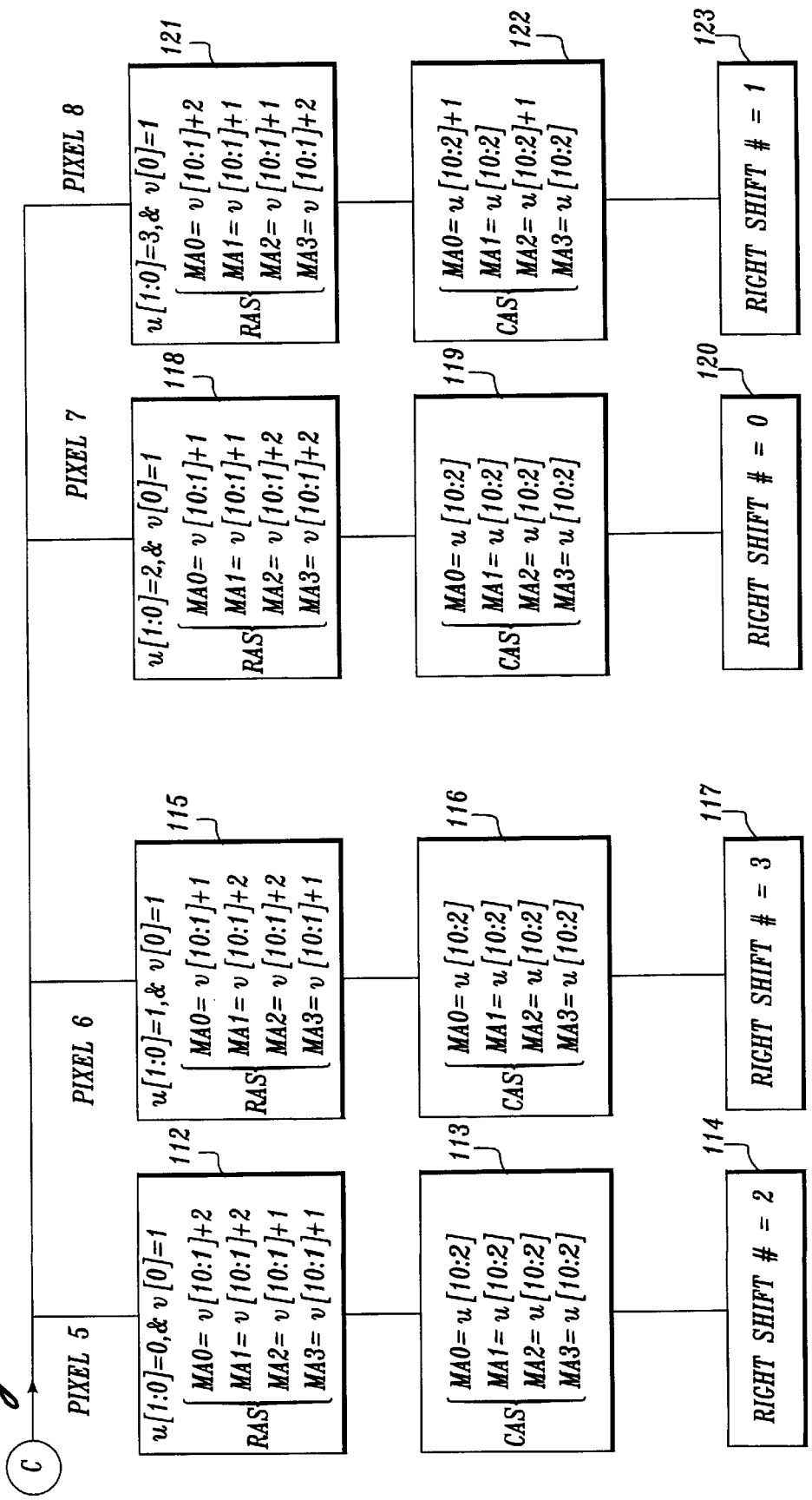

FIGS. 10a–b are flow graphs showing the assertion of signals for the eight pixels in a noninterleave mode memory's architecture. Similar to FIGS. 7a–7b, the texel buffer 18 reads the four neighboring texels in a single read cycle. However, the texel buffer 18 in the noninterleave mode memory architecture reads just four output signals: MA0, MA1, MA2 and MA3. At a step 99, the texel buffer 18 determines the location of where the color texel falls within the range of eight possible pixels as shown in FIG. 4. After the color pixel is determined to fall within the pixel 1, 2, 3, 4, 5, 6, 7, or 8, the four memory address signals MA0, MA1, MA2, and MA3 are appropriately asserted to retrieve the corresponding four neighboring texels within a single cycle to compute the value of the colored texel. At a step 100 for a pixel 1 with u[1:0]=0 and v[0]=0, the RAS signal sets the MA0 and MA1 signals to v[10:1], and sets the output signals MA2 and MA3 to v[10:1]+1. At a step 101, the CAS signal sets all four memory address signals MA0, MA1, MA2, and MA3 to u[10:2]. At a step 102, the right shift signal is set to zero. At a step 103 for a pixel 2 with u[1:0] and v[0]=0, the RAS signal sets the MA0 and MA3 to v[10:1]+1 and sets the MA1 and MA2 signals to v[10:1]. At a step 104, the CAS signal sets all four memory address signals MA0, MA1, MA2 and MA3 to u[10:2]. At a step 105, the right shift signal is set to a numerical value of 1.

At a step 106 for a pixel 3 with u[1:0]=2 and v[0]=0, the RAS signal asserts the MA0 and MA1 signals to v[10:1]+1, and sets the MA2 and MA3 signals to v[10:1]. At a step 107, the CAS signal asserts all of the memory address signals MA0, MA1, MA2, and MA3 to u[10:2]. At a step 108, the right shift signal is set to a numerical value of 2. At a step 109 for a pixel 4 with u[1:0]=3 and v[0]=0, the RAS signal sets the output signal MA0 and MA3 to v[10:1], and sets the MA1 and MA2 to v[10:1]+1. At a step 110, the CAS signal sets the output signal MA1 and MA3 to u[10:2], and sets the MA0 and MA2 to u[10:2]+1. At a step 111, the right shift signal is set to a numerical value of 3.

At a step 112 for a pixel 5 with u[1:0]=0 and v[0]=1, the RAS signal sets the output signals MA0 and MA1 to v[10:1]+2, and sets the MA2 and MA3 output signals to v[10:1]+1. At a step 113, the CAS signal sets all of the output memory address signals MA0, MA1, MA2, and MA3 to u[10:2]. At a step 114, the right shift signal is set to a numerical value of 2. At a step 115 for a pixel 6 with u[1:0]=1 and v[0]=1, the RAS signal sets the output signals MA0 and MA3 to v[10:1]+1, and MA1 and MA2 to v[10:1]+2. At a step 116, the CAS signal sets all of the output memory address signals MA0, MA1, MA2, and MA3 to u[10:2]. At a step 117, the right shift signal is set to a numerical value of three. At a step 118 for a pixel 7 with u[1:0]=2 and v[0]=1, the RAS signal sets the output signals MA0 and MA1 to v[10:1]+1, and MA2 and MA3 to to v[10:1]+2. At a step 119, the CAS sets all the output memory address signals MA0, MA1, MA2, and MA3 to u[10:2]. At a step 120, the right shift signal is set to a numerical value of zero. At a step 121 for a pixel 8 with u[1:0]=3 and v[0]=1, the RAS signal sets the output signals MA0 and MA3 to v[10:1]+2, and sets the MA1 and MA2 signals to v[10:1]+1. At a step 122, the CAS signal sets the output signals MA0 and MA2 to u[10:2]+1, and sets the MA1 and MA3 signals to u[10:2]. At a step 123, the right shift signal is set to a numerical value of 1.

In FIG. 11a, there is shown a schematic diagram of the swap circuit in re-arranging the order of a set of four neighboring texels. The swap circuit 19 includes a plurality of muxes 124, 125, 126, and 127. Each of the muxes 124, 125, 126, and 127 has four inputs, an output, and a select signal. A texel retrieved from the memory bank 95 is designated as B0, a texel retrieved from the memory bank 96 is designated as B1, a texel retrieved from the memory bank 97 is denoted as B2, and a texel retrieved from the memory bank 98 is denoted as B3. The select signal of the mux 124 chooses from among the four inputs of B0, B1, B2, and B3, and generates an output C0 that contains either B0, B1, B2, or B3. The mux 100 generates an output C1 that contains either B0, B1, B2, or B3 as dictated by the select signal of the mux 125. The select signal of the mux 126 chooses from among the four inputs of B0, B1, B2, and B3, and generates an output C2 that contains either B0, B1, B2, or B3. The mux 127 generates an output C3 that contains either B0, B1, B2, or B3 as dictated by the select signal of the mux 127.

FIG. 11b is a block diagram showing the texel arrangement of B0, B1, B2, and B3 from the four memory banks. In a block 128, the texels are arranged with a coordinate pair (0, 0) at B0, a coordinate pair (1, 0) at B1, a coordinate pair (2, 0) at B2, and a coordinate pair (3, 0) at B3. In a block 129, the texels are arranged with a coordinate pair (2, 1) at B0, a coordinate pair (3, 1) at B1, a coordinate pair (0, 1) at B2, and a coordinate pair (1, 1) at B3. In a block 130, the texels are arranged with a coordinate pair (0, 2) at B0, a coordinate pair (1, 2) at B1, a coordinate pair (2, 2) at B2, and a coordinate pair (3, 2) at B3. Blocks 131, 132, and 133 similarly show the coordinates retrieved at B0, B1, B2, and B3 positions. Each of the blocks 128–133 contains four coordinate pairs, B0, B1, B2, and B3 that represent the retrieval of the four neighboring texels required to interpolate a color texel. The four neighboring texels retrieved in B0, B1, B2, and B3 must be the four nearest integer texels to the color texel to be interpolated. The four neighboring texels form a quadrilateral around the color texel. The blocks 128–133 are intended as illustrations of the coordinate pairs retrieved for a particular color texel and the combinations of the neighboring texels can be extended to a higher or negative integer numbers by a person skilled in the art.

Although specific embodiments have been illustrated and described, it will be obvious to those skilled in the art that various modifications may be made without departing from the spirit which is intended to be limited solely by the appended claims. For example, the interleaved memory banks can be constructed with four branches of memory banks for each 16-bit data, instead of two branches of A and B memory banks. Furthermore, the storage sequence of the four neighboring texels can be altered in a reverse or modified order, such as in the order of B3, B2, B1, and B0, rather than in an incremental order of B0, B1, B2, and B3. Thus, while the preferred embodiment of the invention has been illustrated and described, it will be appreciated that various changes can be made therein without departing from the spirit and scope of the invention.

What is claimed is:

1. A noninterleave system, comprising:
   a texel address generator for generating a color texel; and
   a texel buffer comprising:
   a first memory bank for retrieving a first texel data, the first memory storing a first plurality of texels in the combinations of $(x=4n, y=2m)$ or $(x=4n+2, y=2m+1)$, where n and m are integers;
   a second memory bank for retrieving a second texel data, the second memory bank for storing a second plurality of texels in the combinations of $(x=4n+1, y=2m)$ or $(x=4n+3, y=2m+1)$;
   a third memory bank for retrieving a third texel data, the third memory bank for storing a third plurality of texels in the combinations of $(x=4n+2, y=2m)$ or $(x=4n, y=2m+1)$; and
   a fourth memory bank for storing a fourth texel data, the fourth memory bank storing a fourth plurality of texels in the combinations of $(x=4n+3, y=2m)$ or $(x=4n+1, y=2m+1)$;
   wherein the first, second, third, and fourth texels form a quadrilateral such that the color texel falls within the quadrilateral, each of the first, second, third, and fourth texels being set to an integer number that is not equal to the coordinate of the color texel.

2. The noninterleave system of claim 1, further comprising a swap circuit for swapping the locations of the first, second, third, and fourth texels.

3. The noninterleave system of claim 2 wherein the swap circuit comprising a first mux having a first input for receiving the first texel, a second input for receiving the second texel, a third input for receiving the third texel, a fourth input for receiving the fourth texel, an output for generating a C0 texel, and a control signal for selecting one of the first, second, third, or fourth input of the first mux.

4. The noninterleave system of claim 2 wherein the swap circuit comprising a second mux having a first input for receiving the first texel, a second input for receiving the second texel, a third input for receiving the third texel, a fourth input for receiving the fourth texel, an output for generating a C1 texel, and a control signal for selecting one of the first, second, third, or fourth input of the second mux.

5. The noninterleave system of claim 2 wherein the swap circuit comprising a third mux having a first input for receiving the first texel, a second input for receiving the second texel, a third input for receiving the third texel, a fourth input for receiving the fourth texel, an output for generating a C2 texel, and a control signal for selecting one of the first, second, third, or fourth input of the third mux.

6. The noninterleave system of claim 2 wherein the swap circuit comprising a fourth mux having a first input for receiving the first texel, a second input for receiving the second texel, a third input for receiving the third texel, a fourth input for receiving the fourth texel, an output for generating a C3 texel, and a control signal for selecting one of the first, second, third, or fourth input of the fourth mux.

7. A method for generating a color texel in a noninterleave system on an (x, y) coordinate such that the x coordinate is a function of an integer n and the y coordinate is a function of an integer m, comprising the steps of:
   generating a color texel that does not match with the value of texels in a texel buffer;
   interpolating the color pixel, comprising the steps of:
   retrieving a first (x, y) texel from a first memory bank that stores a first plurality of texels in the combinations of $(x=4n, y=2m)$ or $(x=4n+2, y=2m+1)$;
   retrieving a second (x, y) texel from a second memory bank that stores a second plurality of texels in the combinations of $(x=4n+1, y=2m)$ or $(x=4n+3, y=2m+1)$;
   retrieving a third (x, y) texel from a third memory bank that stores a third plurality of texels including in the combinations of $(x=4n+2, y=2m)$ or $(x=4n, y=2m+1)$; and
   retrieving a fourth (x, y) texel from a fourth memory bank that stores a fourth plurality of texel points in the combinations of $(x=4n+3, y=2m)$ or $(x=4n+1, y=2m+1)$,
   wherein the first, second, third, and fourth texel points form the four nearest integer texels to the color texel.

8. The method of claim 7 further comprising the step of swapping the first, second, third, or fourth texels to generate a first output texel C0.

9. The method of claim 7 further comprising the step of swapping the first, second, third, or fourth texels to generate a second output texel C1.

10. The method of claim 7 further comprising the step of swapping the first, second, third, or fourth texels to generate a third output texel C2.

11. The method of claim 7 further comprising the step of swapping the first, second, third, or fourth texels to generate a fourth output texel C3.

12. An interleave system, comprising:
   a texel address generator for generating a color texel;
   a texel buffer having a plurality of (x, y) texels that do not match with the value of the color texel, wherein the coordinate x is a function of an integer m and the coordinate y is a function of an integer n, comprising:

a first nearest integer coordinate texel from the color texel and being selected from a memory bank A0 or a memory bank B0, the memory bank A0 storing a plurality of texels in the combination of x=4n, y=2m), the memory bank B0 storing a plurality of texels in the combination of (x=4n+2, y=2m+1);

a second nearest integer coordinate texel from the color texel and being selected from a memory bank A1 or a memory B1, the memory bank A1 storing a plurality of texels in the combination of (x=4n+1, y=2m), the memory bank B1 storing a plurality of texels in the combination of (x=4n+3, y=2m +1);

a third nearest integer coordinate texel from the color texel and being selected from a memory bank A2 or a memory B2, the memory bank A2 storing a plurality of texels in the combination of (x=4n+2, y=2m), the memory bank B2 storing a plurality of texels in the combination of (x=4n, y=2m+1); and a fourth nearest integer texel from the color texel and being selected from a memory bank A3 or a memory B3, the memory bank A3 storing a plurality of texels in the combination of (x=4n+3, y=2m), the memory bank B3 storing a plurality of texels in the combination of (x=4n+1, y=2m+1);

wherein the first, second, third, and fourth texels forming a quadrilateral such that the color texel falls within the quadrilateral.

13. The interleave system of claim 12, further comprising a swap circuit for swapping the locations of the first, second, third, and fourth texels.

14. The interleave system of claim 13 wherein the swap circuit comprising a first mux having a first input for receiving the first texel, a second input for receiving the second texel, a third input for receiving the third texel, a fourth input for receiving the fourth texel, an output for generating a C0 texel, and a control signal for selecting one of the first, second, third, or fourth input of the first mux.

15. The interleave system of claim 13 wherein the swap circuit comprising a second mux having a first input for receiving the first texel, a second input for receiving the second texel, a third input for receiving the third texel, a fourth input for receiving the fourth texel, an output for generating a C1 texel, and a control signal for selecting one of the first, second, third, or fourth input of the second mux.

16. The interleave system of claim 13 wherein the swap circuit comprising a third mux having a first input for receiving the first texel, a second input for receiving the second texel, a third input for receiving the third texel, a fourth input for receiving the fourth texel, an output for generating a C2 texel, and a control signal for selecting one of the first, second, third, or fourth input of the third mux.

17. The interleave system of claim 13 wherein the swap circuit comprising a fourth mux having a first input for receiving the first texel, a second input for receiving the second texel, a third input for receiving the third texel, a fourth input for receiving the fourth texel, an output for generating a C3 texel, and a control signal for selecting one of the first, second, third, or fourth input of the fourth mux.

18. A method for generating a color texel point in an interleave mode on an (x, y) coordinate of a display such that the x coordinate is a function of an integer n and the y coordinate is a function of an integer m, comprising the steps of:

generating a color texel that does not match with the value of texels in a texel buffer;

interpolating the color texel, comprising the steps of:

retrieving a first nearest integer texel from the color texel and being selected from a memory bank A0 or a memory bank B0, the memory bank A0 storing a plurality of texels in the combination of (x=4n, y=2m), the memory bank B0 storing a plurality of texels in the combination of (x=4n+2, y=2m+1);

retrieving a second nearest integer texel from the color texel and being selected from a memory bank A1 or a memory B1, the memory bank A1 storing a plurality of texels in the combination of (x=4n+1, y=2m), the memory bank B1 storing a plurality of texels in the combination of (x=4n+3, y=2m+1);

retrieving a third nearest integer texel from the color texel and being selected from a memory bank A2 or a memory B2, the memory bank A2 storing a plurality of texels in the combination of (x=4n+2, y=2m), the memory bank B2 storing a plurality of texels in the combination of (x=4n, y=2m+1); and retrieving a fourth nearest integer texel from the color texel and being selected from a memory bank A3 or a memory B3, the memory bank A3 storing a plurality of texels in the combination of (x=4n+3, y=2m), the memory bank B3 storing a plurality of texels in the combination of (x=4n+1, y=2m+1);

wherein the upper left, upper right, lower right, and lower left forms the four closest integer texels to the color texel.

19. The method of claim 18 further comprising the step of swapping the first, the second, the third, and the fourth nearest integer texels, to generate a first output texel C0.

20. The method of claim 18 further comprising the step of swapping the first, the second, the third, and the fourth nearest integer texels to generate a second output texel C1.

21. The method of claim 18 further comprising the step of swapping the first, the second, the third, and the fourth nearest integer texels to generate a third output texel C2.

22. The method of claim 18 further comprising the step of swapping the first, the second, the third, and the fourth nearest integer texels to generate a fourth output texel C3.

* * * * *

UNITED STATES PATENT AND TRADEMARK OFFICE
CERTIFICATE OF CORRECTION

PATENT NO. : 6,104,413　　　　　　　　　　　　　　Page 1 of 3
DATED　　　: August 15, 2000
INVENTOR(S) : C.-Y. Cheng et al.

It is certified that error appears in the above-identified patent and that said Letters Patent is hereby corrected as shown below:

| COLUMN | LINE | |
|---|---|---|
| [73] p. 1, col. 1 | Assignee | after "Institute," insert --Hsinchu,-- |
| 14 (Claim 3, | 2 line 2) | "comprising" should read --comprises-- |
| 14 (Claim 3, | 6 line 6) | "C0" should read --C0-- |
| 14 (Claim 4, | 9 line 2) | "comprising" should read --comprises-- |
| 14 (Claim 4, | 13 line 6) | "C1" should read --C1-- |
| 14 (Claim 5, | 15 line 2) | "comprising" should read --comprises-- |
| 14 (Claim 5, | 19 line 6) | "C2" should read --C2-- |
| 14 (Claim 6, | 22 line 2) | "comprising" should read --comprises-- |

UNITED STATES PATENT AND TRADEMARK OFFICE
CERTIFICATE OF CORRECTION

PATENT NO. : 6,104,413
DATED : August 15, 2000
INVENTOR(S) : C.-Y. Cheng et al.

Page 2 of 3

It is certified that error appears in the above-identified patent and that said Letters Patent is hereby corrected as shown below:

| COLUMN | LINE | |
|---|---|---|
| 14 (Claim 6, | 26 line 6) | "C3" should read --C3-- |
| 14 (Claim 7, | 48 line 22) | "y=2m+1)," should read --y=2m+1);-- |
| 15 (Claim 12, | 27-28 lines 31-32) | "form-ing" should read --forms-- |
| 15 (Claim 14, | 34 line 2) | "comprising" should read --comprises-- |
| 15 (Claim 14, | 38 line 6) | "C0" should read --C0-- |
| 15 (Claim 15, | 41 line 2) | "comprising" should read --comprises-- |
| 15 (Claim 15, | 45 line 6) | "C1" should read --C1-- |
| 15 (Claim 16, | 48 line 2) | "comprising" should read --comprises-- |

UNITED STATES PATENT AND TRADEMARK OFFICE
CERTIFICATE OF CORRECTION

PATENT NO. : 6,104,413
DATED : August 15, 2000
INVENTOR(S) : C.-Y. Cheng et al.

It is certified that error appears in the above-identified patent and that said Letters Patent is hereby corrected as shown below:

| COLUMN | LINE | |
|---|---|---|
| 15 (Claim 16, line 6) | 52 | "C2" should read --$C_2$-- |
| 15 (Claim 17, line 2) | 55 | "comprising" should read --comprises-- |
| 16 (Claim 17, line 6) | 4 | "C3" should read --$C_3$-- |
| 16 (Claim 19, line 3) | 44 | "texels, to" should read --texels to-- |

Signed and Sealed this

Twenty-ninth Day of May, 2001

Attest:

NICHOLAS P. GODICI

*Attesting Officer*   *Acting Director of the United States Patent and Trademark Office*